United States Patent
Assefa et al.

(10) Patent No.: US 9,229,164 B2
(45) Date of Patent: *Jan. 5, 2016

(54) BUTT-COUPLED BURIED WAVEGUIDE PHOTODETECTOR

(71) Applicant: International Business Machines Corporation, Armonk, NY (US)

(72) Inventors: Solomon Assefa, Ossining, NY (US); William M. Green, Astoria, NY (US); Steven M. Shank, Jericho, VT (US); Yurii A. Vlasov, Katonah, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,477

(22) Filed: Apr. 23, 2013

(65) Prior Publication Data

US 2014/0312443 A1    Oct. 23, 2014

(51) Int. Cl.
| | |
|---|---|
| H01L 31/18 | (2006.01) |
| H01L 31/08 | (2006.01) |
| H01L 31/0232 | (2014.01) |
| G02B 6/13 | (2006.01) |

(Continued)

(52) U.S. Cl.
CPC .............. *G02B 6/13* (2013.01); *G02B 6/12004* (2013.01); *G02B 6/132* (2013.01)

(58) Field of Classification Search
CPC ....... H01L 31/18; H01L 31/0232; G02B 6/13
USPC ............................................ 257/432; 438/69
See application file for complete search history.

(56) References Cited

U.S. PATENT DOCUMENTS

| | | |
|---|---|---|
| 6,307,242 B1 | 10/2001 | Sugiyama |
| 6,897,498 B2 | 5/2005 | Gothoskar et al. |
| 7,151,881 B2 | 12/2006 | West et al. |

(Continued)

FOREIGN PATENT DOCUMENTS

| | | |
|---|---|---|
| CN | 104124304 A | 10/2014 |
| WO | 2008080428 A1 | 7/2008 |
| WO | WO2014113440 A1 | 7/2014 |

OTHER PUBLICATIONS

Pending U.S. Appl. No. 13/741,416, filed Jan. 15, 2013, Entitled: "Buried Waveguide Photodetector".

(Continued)

*Primary Examiner* — Asok K Sarkar
*Assistant Examiner* — Dmitriy Yemelyanov
(74) *Attorney, Agent, or Firm* — Michael LeStrange; Andrew M. Calderon; Roberts Mlotkowski Safran & Cole, P.C.

(57) ABSTRACT

A method of forming an integrated photonic semiconductor structure having a photodetector and a CMOS device may include forming the CMOS device on a first silicon-on-insulator region, forming a silicon optical waveguide on a second silicon-on-insulator region, and forming a shallow trench isolation (STI) region surrounding the silicon optical waveguide such that the shallow trench isolation electrically isolates the first and second silicon-on-insulator region. Within the STI region, a germanium material is deposited adjacent an end facet of the semiconductor optical waveguide. The germanium material forms an active region that receives propagating optical signals from the end facet of the semiconductor optical waveguide.

19 Claims, 13 Drawing Sheets

(51) Int. Cl.
*G02B 6/12* (2006.01)
*G02B 6/132* (2006.01)

(56) References Cited

U.S. PATENT DOCUMENTS

| | | |
|---|---|---|
| 7,418,166 B1 | 8/2008 | Kapur et al. |
| 7,453,132 B1 | 11/2008 | Gunn, III et al. |
| 7,616,904 B1 | 11/2009 | Gunn, III et al. |
| 7,749,876 B2 | 7/2010 | Barthelmess et al. |
| 8,633,067 B2 | 1/2014 | Assefa et al. |
| 2007/0170536 A1 | 7/2007 | Hsu et al. |
| 2007/0189688 A1* | 8/2007 | Dehlinger et al. ............ 385/129 |
| 2009/0101909 A1* | 4/2009 | Chen et al. ...................... 257/65 |
| 2010/0327381 A1 | 12/2010 | Morse et al. |
| 2011/0037133 A1* | 2/2011 | Su et al. ........................ 257/432 |
| 2011/0049660 A1 | 3/2011 | Suh et al. |
| 2012/0129302 A1* | 5/2012 | Assefa et al. ................. 438/154 |
| 2014/0197507 A1* | 7/2014 | Assefa et al. ................. 257/432 |

OTHER PUBLICATIONS

Cervantes-Gonzalez et al., "Germanium metal-semiconductor-metal photodetectors evanescently coupled with upper-level silicon oxynitride dielectric waveguides," Applied Physics Letters, Dec. 28, 2012, vol. 101, Issue 261109, American Institute of Physics.

European Patent Office, "Notification of Transmittal of the International Search Report and the Written Opinion of the International Searching Authority, or the Declaration," May 27, 2014, International Application No. PCT/US2014/011629.

Masini et al., "Near-infared waveguide photodetectors based on polycrystalline Ge on silicon-on-insulator substrates," Optical Materials, May 30, 2000, p. 243-246, vol. 17, Elsevier Science B.V.

\* cited by examiner

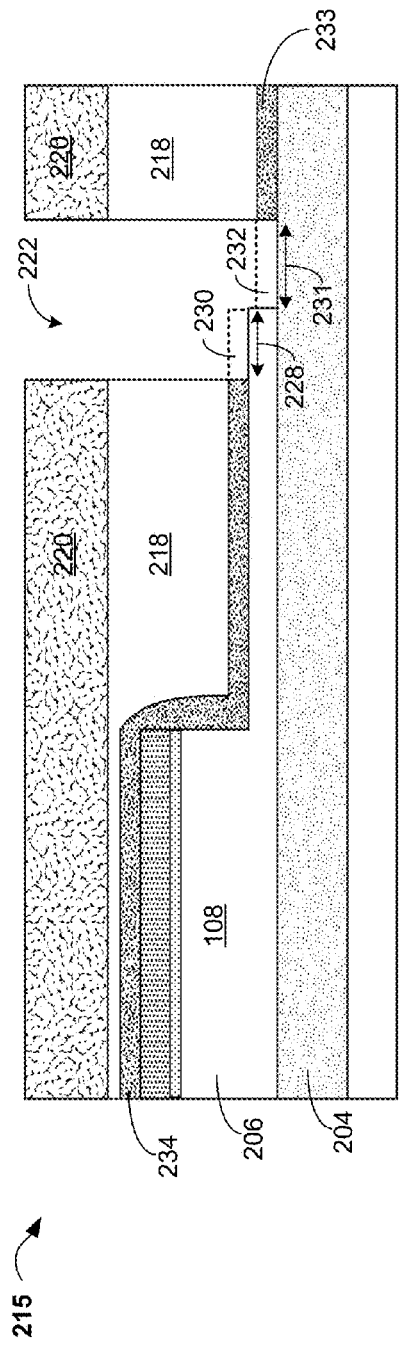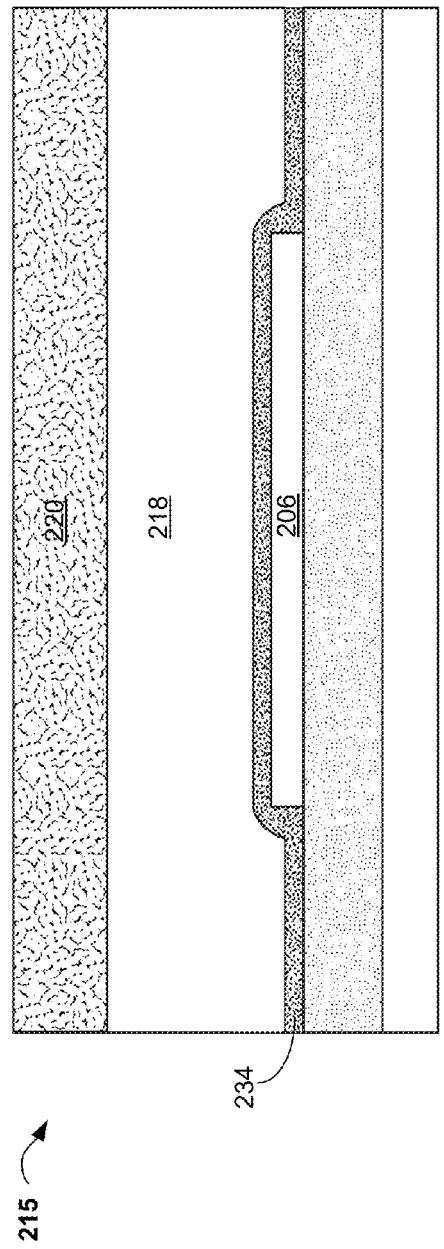
FIG. 2B
FIG. 2B'

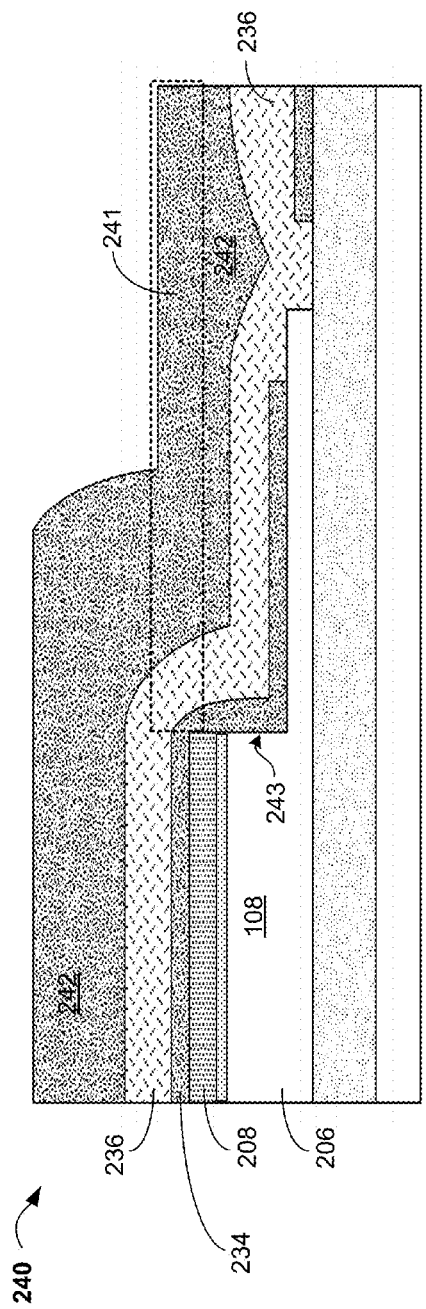
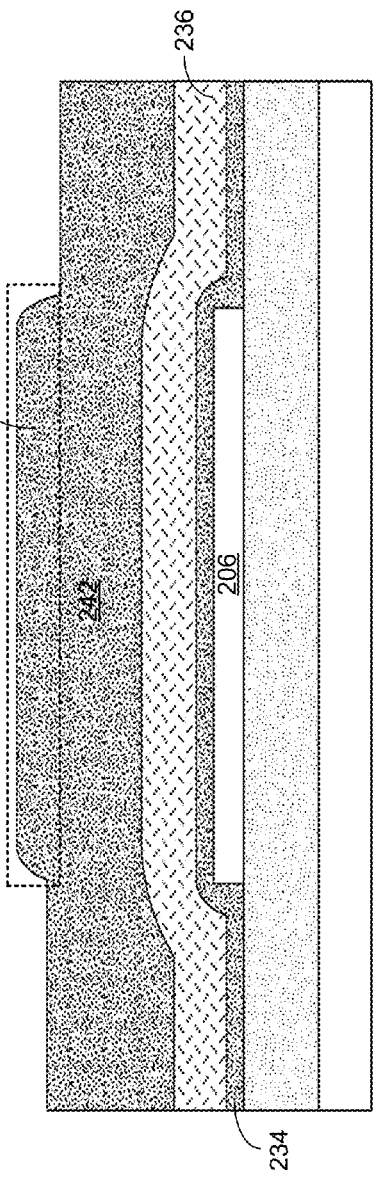
FIG. 2D
FIG. 2D'

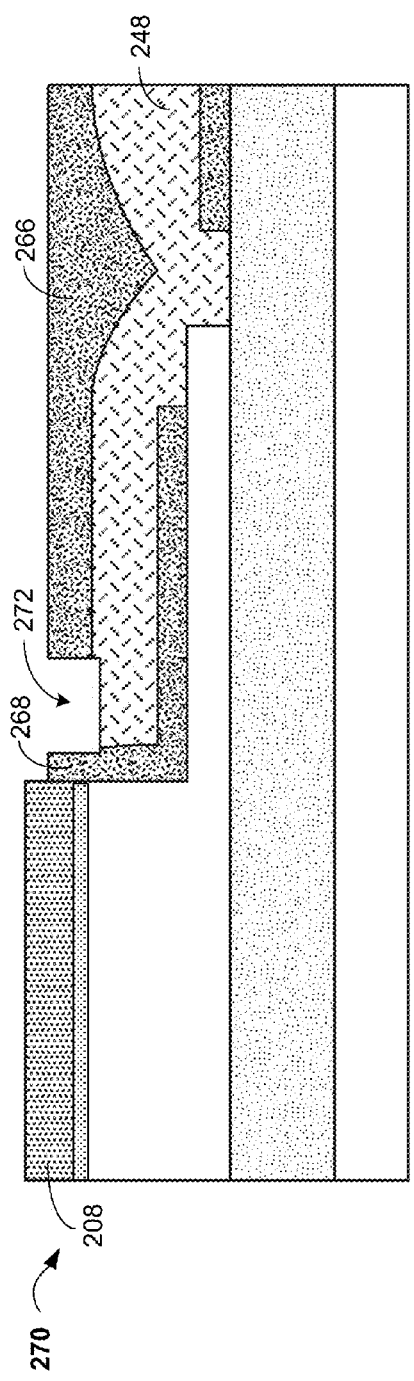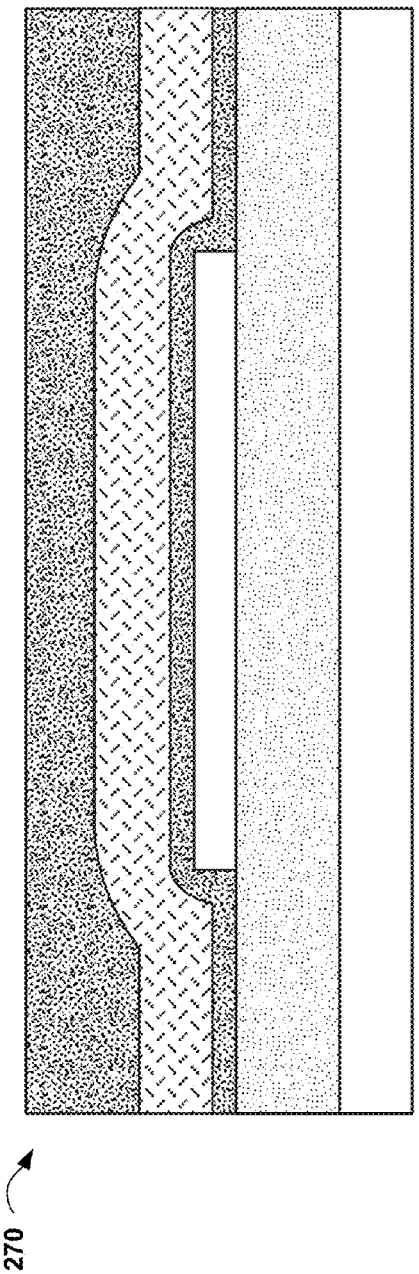
FIG. 2F
FIG. 2F'

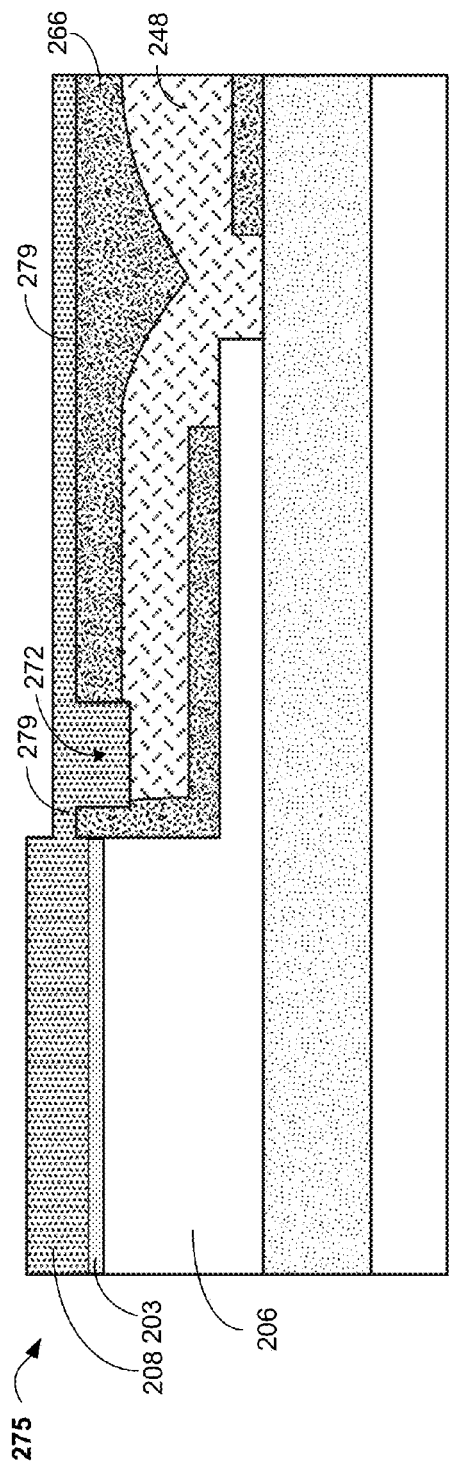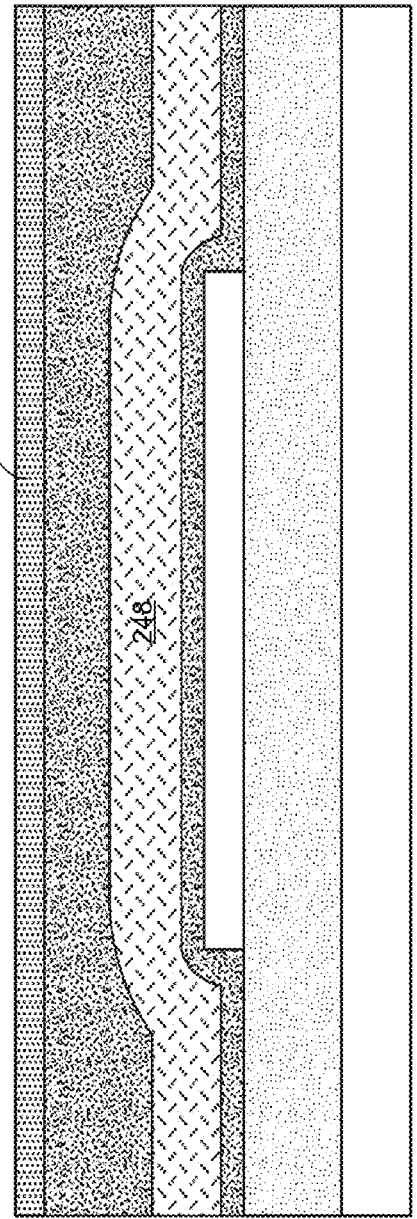
FIG. 2G
FIG. 2G'

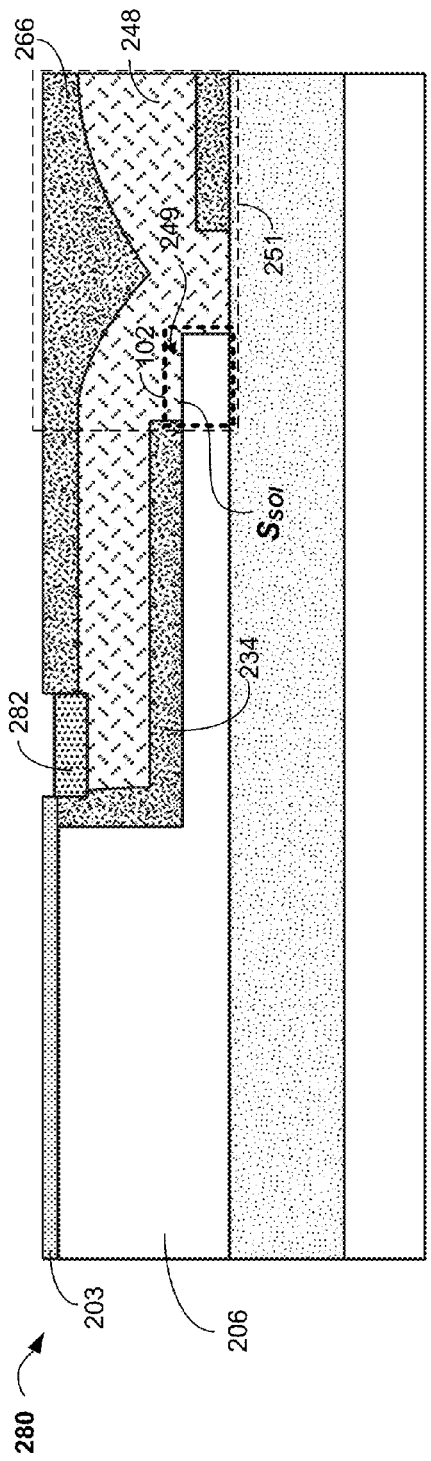
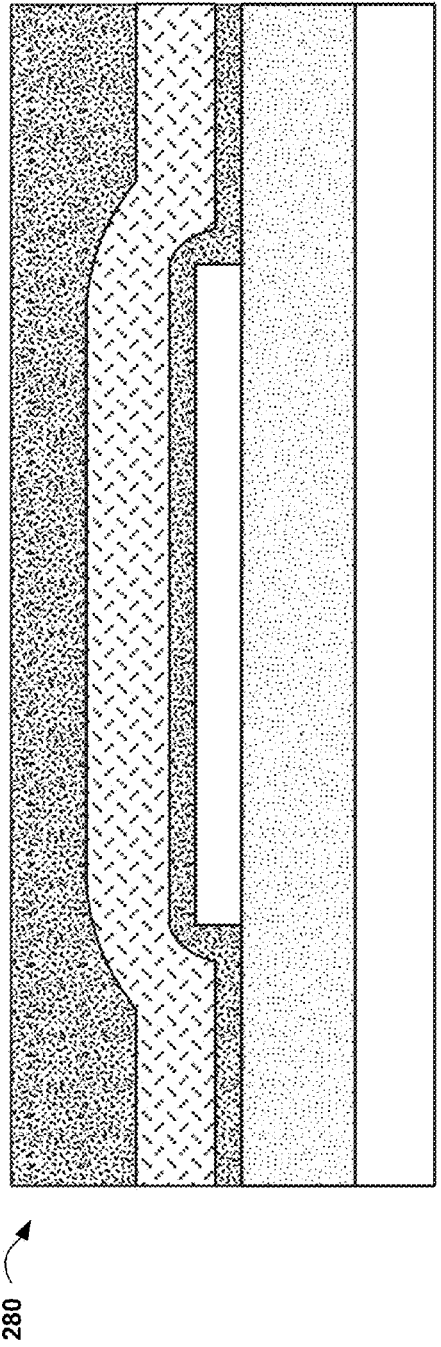
FIG. 2H
FIG. 2H'

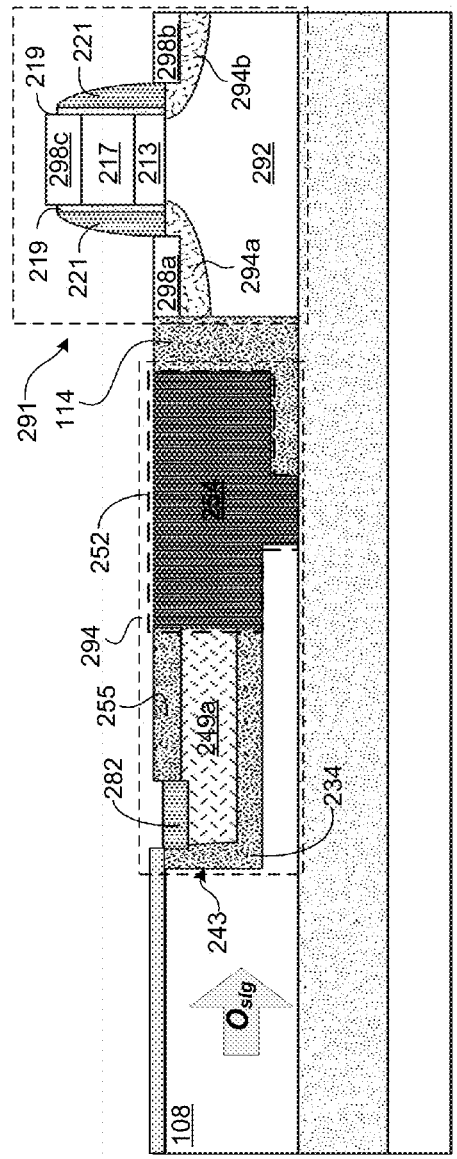
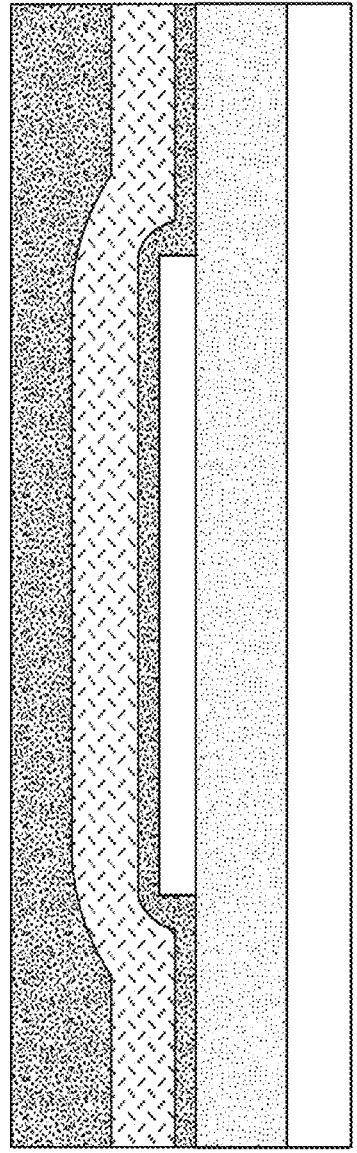
FIG. 2I
FIG. 2I'

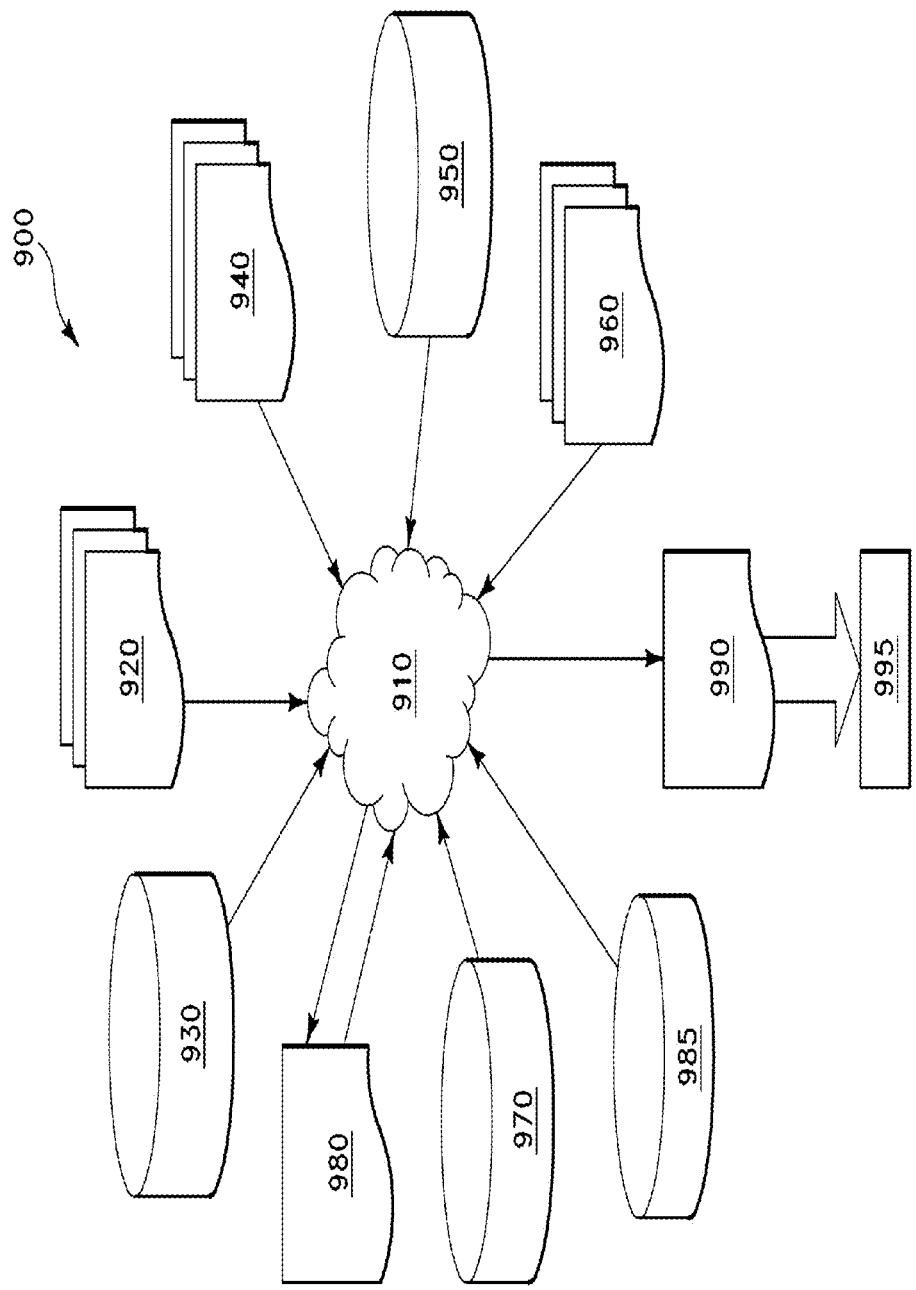

BUTT-COUPLED BURIED WAVEGUIDE PHOTODETECTOR

BACKGROUND a. Field of the Invention

The present invention generally relates to semiconductor devices, and particularly to integrated photonic semiconductor devices.

b. Background of Invention

The use of both photonic devices in high-speed switching and transceiver devices in data communications are but a few examples that highlight the advantages of processing both optical and electrical signals within a single integrated device. For example, an integrated photonic device may include both photodetector and CMOS type devices that may be fabricated on a single substrate. As such, while engaging in the fabrication of one type of device (i.e., photonic devices); other device types (i.e., CMOS devices) may be impacted. In addition to mitigating adverse effects associated with the different fabrication processes corresponding to each type of device (i.e., photonic/CMOS devices), facilitating increased device performance within an integrated photonic semiconductor device structure may be desirable.

It may therefore, among other things, be advantageous to fabricate, within an integrated photonic device, photodetector device structures that have enhanced performance characteristics.

BRIEF SUMMARY

According to at least one exemplary embodiment, a method of forming an integrated photonic semiconductor structure having a photodetector device and a CMOS device is provided. The method may include forming a well region for the CMOS device, forming an isolation region for electrically isolating the photodetector device from the well region, and forming a semiconductor optical waveguide for propagating optical signals. Within the isolation region, germanium material is deposited adjacent to an end facet of the semiconductor optical waveguide, whereby the deposited germanium material forms an active region of the photodetector device for receiving the propagating optical signals from the end facet of the semiconductor optical waveguide structure.

According to at least one other exemplary embodiment, a method of forming an integrated photonic semiconductor structure having a photodetector device and a CMOS device is provided. The method may include forming the CMOS device on a first silicon-on-insulator region and forming a silicon optical waveguide on a second silicon-on-insulator region. A shallow trench isolation region surrounding the silicon optical waveguide is also formed such that the shallow trench isolation electrically isolates the first and the second silicon-on-insulator region. Within a region of the shallow trench isolation region, germanium material is deposited adjacent an end facet of the semiconductor optical waveguide, whereby the deposited germanium material forms an active region of the photodetector device for receiving propagating optical signals from the end facet of the semiconductor optical waveguide.

According to at least one other exemplary embodiment, an integrated photonic semiconductor structure may include a substrate, an isolation region, a CMOS device located on the substrate, and a semiconductor optical waveguide structure located on the substrate and electrically isolated from the CMOS device by the isolation region, whereby the semiconductor optical waveguide structure has an end facet. The integrated photonic semiconductor structure further includes a photodetector located within the isolation region such that the photodetector has a germanium active region located adjacent to the end facet of the waveguide structure. The germanium active region receives propagating optical signals from the end facet of the semiconductor optical waveguide.

According to at least one other exemplary embodiment, a design structure tangibly embodied in a machine readable medium for designing, manufacturing, or testing an integrated circuit is provided. The design structure may include a substrate, an isolation region, a CMOS device located on the substrate, and a semiconductor optical waveguide structure located on the substrate and electrically isolated from the CMOS device by the isolation region, whereby the semiconductor optical waveguide structure has an end facet. The integrated photonic semiconductor structure further includes a photodetector located within the isolation region such that the photodetector has a germanium active region located adjacent to the end facet of the waveguide structure. The germanium active region receives propagating optical signals from the end facet of the semiconductor optical waveguide.

BRIEF DESCRIPTION OF THE SEVERAL VIEWS OF THE DRAWINGS

FIGS. 2A-2J' are cross-sectional views corresponding to the fabrication of the integrated photonic semiconductor device structure of FIG. 1, according to an exemplary embodiment; and FIG. 3 is a flow diagram of a design process used in semiconductor design, manufacture, and/or test according to an exemplary embodiment.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The following describes an exemplary embodiment of an integrated photonic semiconductor device structure and corresponding fabrication processes, whereby the integrated photonic semiconductor device structure includes a butt-coupled buried waveguide photodetector device created within a shallow trench isolation (STI) region that electrically isolates the photodetector device from one or more adjacent CMOS devices.

In particular, the following structure and processes may provide an exemplary embodiment of a CMOS integrated nanophotonics device that includes, for example, both a photonic device such as a germanium (Ge) photodetector and a CMOS device such as an FET. Within CMOS integrated nanophotonic circuits, crystalline materials such as germanium or III-V compounds may be utilized as an active element of the photodetector component based on their high quantum efficiency. Using a rapid melt growth technique, films (e.g., germanium) can be deposited at low temperatures in an amorphous state using techniques such as physical vapor deposition (PVD), reduced pressure chemical vapor deposition (RPCVD), plasma enhanced chemical vapor deposition (PECVD), and rapid thermal chemical vapor deposition (RTCVD), and subsequently crystallized thermally. In order to produce a single crystalline germanium (Ge) active region, for example, a deposited amorphous state germanium film may be crystallized by heating the semiconductor wafer over which the germanium film is deposited to about 1100 degrees centigrade (° C.). At around 940° C., the germanium film transforms from a solid state to a liquid state. During a subsequent cooling stage, the liquid germanium is transformed back to a solid as a single crystalline germanium material for forming, for example, a photodetector active region.

Figure 1:
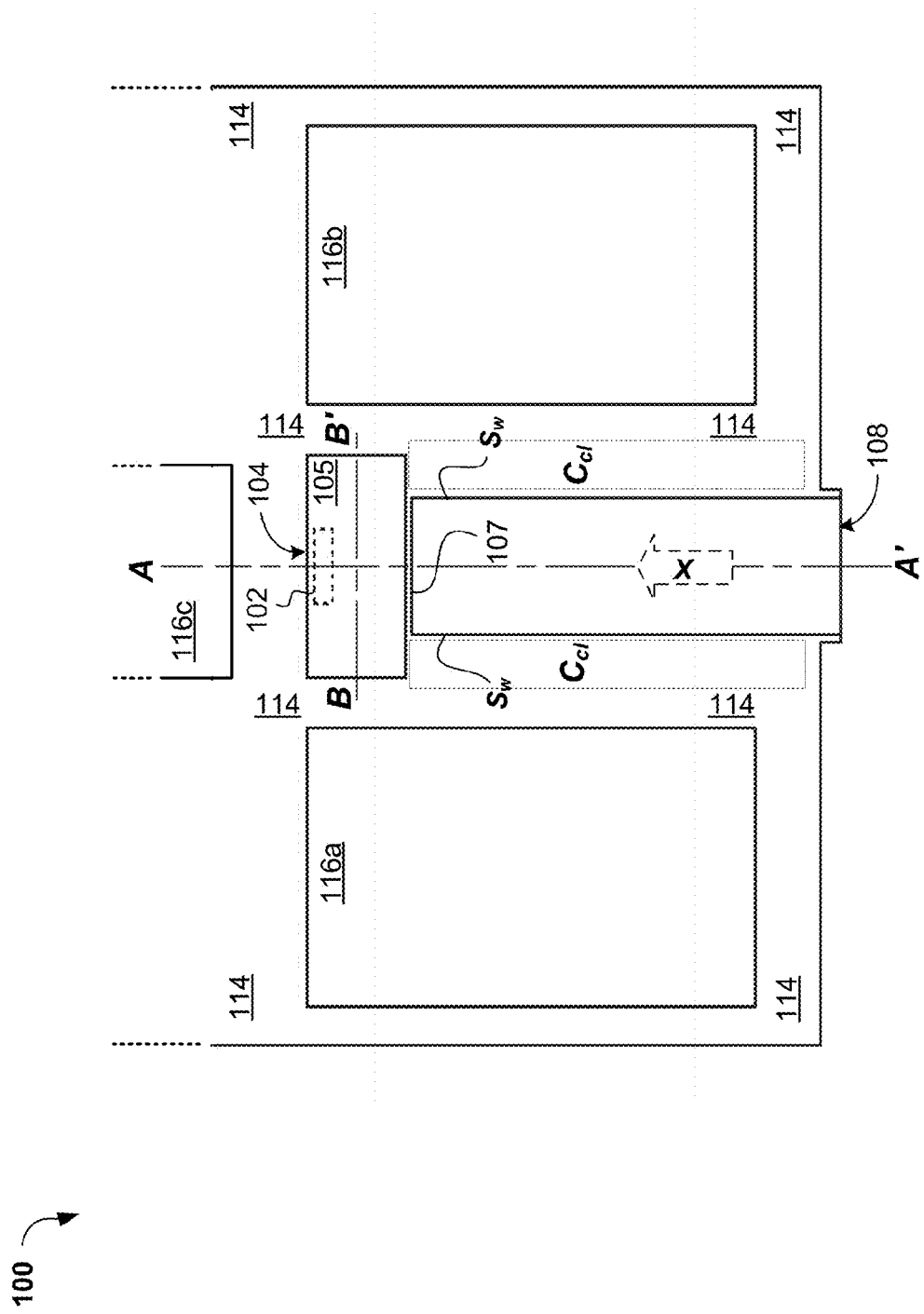
FIG. 1 is a plan view of an integrated photonic semiconductor device structure including a seed window according to an exemplary embodiment.

FIG. 1 is a plan view of an integrated photonic semiconductor device structure 100 including a seed window 102 according to one exemplary embodiment. As depicted, a photodetector structure 104 may include a substantially rectangular region 105 formed adjacent the end facet 107 of a semiconductor waveguide structure 108. As an optical signal (e.g., 1310 nm or 1550 nm wavelength) propagates within the waveguide 108 along the direction of arrow X, the optical signal is directly coupled to the photodetector 104 via end facet 107 of the waveguide structure 108. The rectangular region 105 of the photodetector 104, which forms the active region, is fabricated within STI region 114 of the integrated photonic semiconductor device structure 100. As illustrated, active regions 116a and 116b may be utilized to fabricate CMOS devices such as one or more FET transistor devices (not shown), whereby the active regions 116a, 116b are electrically isolated from the photodetector 104 and waveguide structure 108 via the STI region 114.

During the formation of the photodetector 104 germanium active region, the seed window 102 facilitates the establishment of contact between the deposited germanium film material with the silicon material of optical waveguide 108. This contact enables the germanium film to utilize the silicon material of optical waveguide 108 as a seed layer during the crystallization process described above. Consequently, upon crystallization, the germanium active region including region 105 is formed.

The optical waveguiding may be provided based on the waveguide structure 108 acting as a core having a first refractive index, and the surrounding STI material, as defined by $C_{cl}$, functioning as a cladding having a second refractive index. As such, light is internally guided within the waveguide structure 108 and subsequently directly couples to the rectangular active region 105 of the photodetector 104. By forming the photodetector 104 adjacent the end facet 107 of the semiconductor waveguide structure 108, guided light may be efficiently received by the rectangular active region 105 of the photodetector 104 as a result of the direct coupling (i.e., butt-coupling) between the photodetector 104 and the semiconductor waveguide structure 108. Moreover, as a result of this efficiency, the footprint or size of the photodetector 104 may be reduced in favor of an increased operating speed.

Figure 2A:
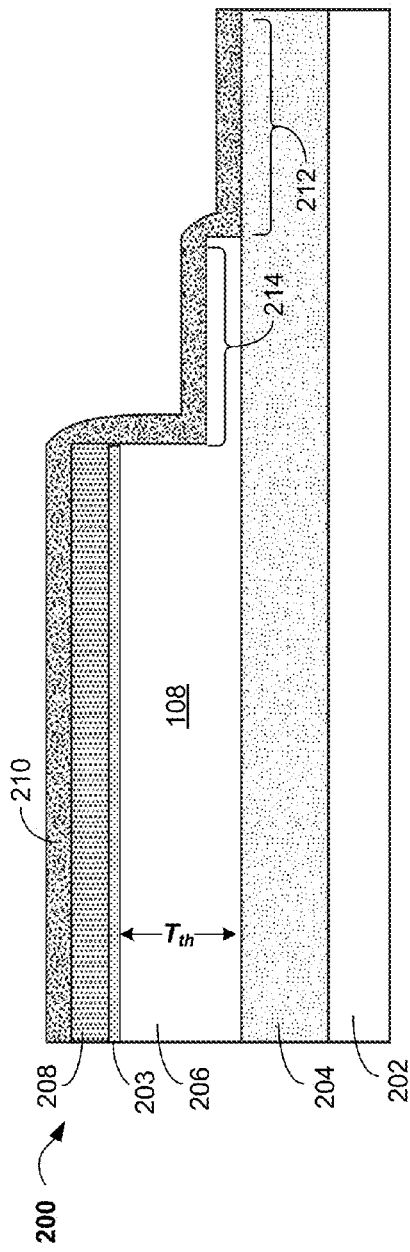
Figure 2A:
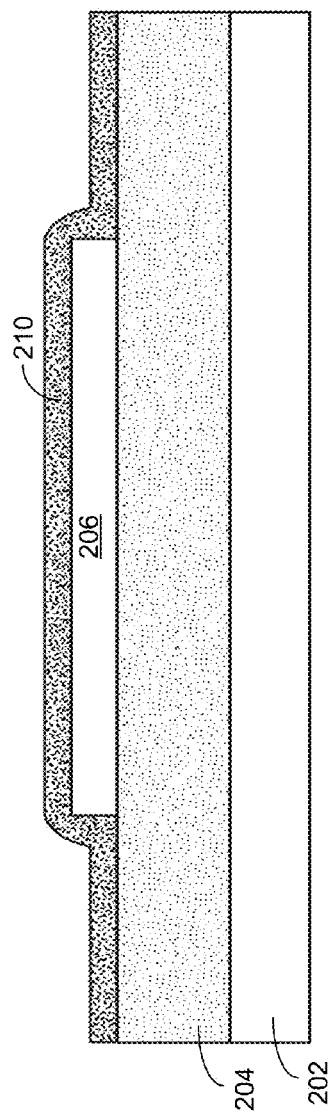

FIGS. 2A-2J' are cross-sectional views corresponding to the fabrication of the integrated photonic semiconductor device structure 100 of FIG. 1, according to an exemplary embodiment. In particular, FIGS. 2A-2J' illustrate integrated photonic semiconductor device processes for forming a photonic device such as a photodetector within an STI region utilized for electrically isolating the photodetector from CMOS devices such FET transistors. The figures (i.e., FIGS. 2A-2J') include two cross sectional view taken along axis A-A', and B-B' of FIG. 1. For example, FIG. 2A is a cross sectional view of a semiconductor structure taken across axis A-A' of FIG. 1, while FIG. 2A' is a cross sectional view of the same semiconductor structure taken across axis B-B' of FIG. 1.

FIG. 2A refers to a cross sectional view of integrated photonic semiconductor structure 200 taken along axis A-A' of FIG. 1. As depicted, structure 200 includes a silicon (Si) substrate 202, a buried oxide (BOX) layer 204 formed over the Si substrate 202, and a silicon-on-insulator (SOI) region 206 corresponding to the waveguide structure 108 formed over the BOX layer 204. The SOI region 206 may be utilized as an active (Rx) region for creating both photonic (e.g., silicon optical waveguides) and CMOS (e.g., FET transistor devices) type device structures. The SOI region 206 may have a thickness, as defined by $T_{th}$, of, for example, 220 nm for 1550 nm optical wavelengths and 170 nm for 1310 nm optical wavelengths. A silicon nitride ($Si_3N_4$) layer 208 may be deposited over a protective oxide layer 203 formed on the SOI region 206, whereby the nitride ($Si_3N_4$) layer 208 may, for example, act as a polish stop during subsequent process steps. A thin layer of oxide 210 having a thickness of about 20-40 nm is deposited over a portion 212 of the BOX layer 204, a portion 214 of the SOI region 206, and over the silicon nitride layer 208. Region 212 may be formed by photolithographic patterning and dry etching (e.g., RIE) of a SOI layer (not shown) located over BOX layer 204. A subsequent photolithographic patterning and partial dry etching (e.g., RIE etching) process may be carried out in order to then form portion 214 of the SOI region 206. Based on the partial etching of the SOI layer, portion 214 is created in the shape of a step having a thickness of about 50 nm. In subsequent process steps, region 214 may be used to form a seed window 102 (FIG. 1) for the crystallization of the deposited germanium material used to create the active region of the photodetector 104 (FIG. 1).

FIG. 2A' refers to a cross sectional view of integrated photonic semiconductor structure 200 taken along axis B-B' of FIG. 1. As depicted, structure 200 along B-B' also includes Si substrate 202, BOX layer 204 formed over the Si substrate 202, and SOI region 206 formed over the BOX layer 204. As shown, oxide 210 may be deposited over region 214 of the SOI layer 206.

FIG. 2B refers to a cross sectional view of integrated photonic semiconductor structure 215 taken along axis A-A' of FIG. 1. The integrated photonic semiconductor structure 215 may be formed by patterned and etched anti-reflection coating 218 and photoresist layer 220, which are deposited over integrated photonic semiconductor structure 200 (FIG. 2A). The anti-reflection coating 218 may be deposited over the structure 200 (FIG. 2A) to create a planar surface for receiving a photoresist layer, which is then patterned to create patterned photoresist layer 220. The opening 222 in the patterned photoresist layer 220 is utilized in order to form the seed window 102 (FIG. 1) described above. As depicted, within opening 222, the oxide layer 210 (FIG. 2A) may be etched (e.g., RIE) selective to region 228 of the SOI layer 206 with minimal overetch into region 231 of BOX layer 204. Thus, only the dotted regions 230, 232 of the oxide layer 210 (FIG. 2B) are etched away leaving oxide liner regions 233 and 234, which are protected by the patterned photoresist layer 220. By removing oxide from dotted region 230, during subsequent germanium deposition processes, the deposited amorphous germanium material contacts silicon region 228 to produce a Ge seed layer.

FIG. 2B' refers to a cross sectional view of the integrated photonic semiconductor structure 215 taken along axis B-B' of FIG. 1. As depicted, the deposited anti-reflection coating 218 conformally covers oxide region 234.

Figure 2C:
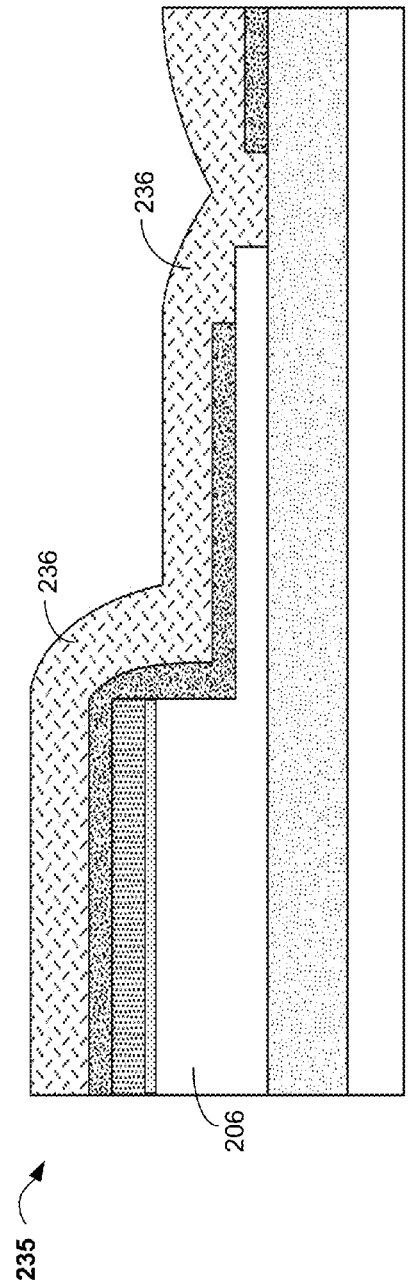
Figure 2C:
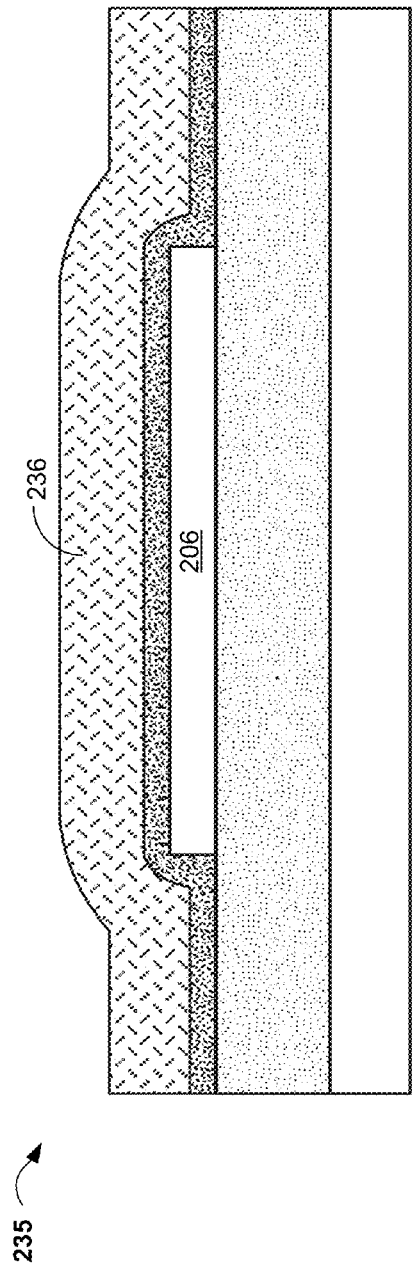

FIG. 2C refers to a cross sectional view of integrated photonic semiconductor structure 235 taken along axis A-A' of FIG. 1. The integrated photonic semiconductor structure 235 may be formed by depositing a layer of germanium material 236 over integrated photonic semiconductor structure 215 (FIG. 2B) once the anti-reflection coating 218 (FIG. 2B) and the patterned photoresist 220 (FIG. 2B) layers have been stripped away. The Ge layer 236 may be deposited using PVD, PECVD, RTCVD, or RPCVD deposition methods. The thickness of the deposited layer of germanium material may be about 50-200 nm. It may be appreciated that in place of germanium, other materials such as III-V materials may be used to form a photodetector active region. Ge layer 236 may be formed by photolithographically patterning and etching (not shown) the integrated photonic semiconductor structure 235 in a manner that removes excess germanium material from the sidewalls $S_w$ (FIG. 1) of the semiconductor waveguide structure 108.

FIG. 2C' refers to a cross sectional view of the integrated photonic semiconductor structure 235 taken along axis B-B' of FIG. 1. As depicted, the deposited Ge layer 236 conformally covers the SOI region 206.

FIG. 2D refers to a cross sectional view of integrated photonic semiconductor structure 240 taken along axis A-A' of FIG. 1. The integrated photonic semiconductor structure 240 may be formed by depositing an undoped thick oxide fill layer 242 over the deposited Ge layer 236 of integrated photonic semiconductor structure 235 (FIG. 2C) using, for example, a high density plasma (HDP) deposition technique. As depicted, the thick oxide fill 242 may act as an electrical insulating material utilized within the shallow trench isolation region 114 (FIG. 1), which electrically isolates the active regions 116a, 116b (FIG. 1), other active regions (not shown), and the waveguide structure 108 (FIG. 1). In subsequent processing steps described in the following paragraphs, a photodetector may be formed adjacent to the end facet 243 of the waveguide structure 108. Accordingly, the thick oxide fill 242 (e.g., $SiO_2$) also isolates the formed photodetector from any other devices (e.g., CMOS FETs) that are created using the active regions 116a, 116b (FIG. 1). The thick oxide fill 242 may include a silicon dioxide ($SiO_2$) material having a thickness in the range of about 3000-6000 Angstroms (Å).

FIG. 2D' refers to a cross sectional view of the integrated photonic semiconductor structure 240 taken along axis B-B' of FIG. 1. As depicted, the deposited oxide fill layer 242 conformally cover the deposited Ge layer 236 located over the oxide liner region 234.

Figure 2E:
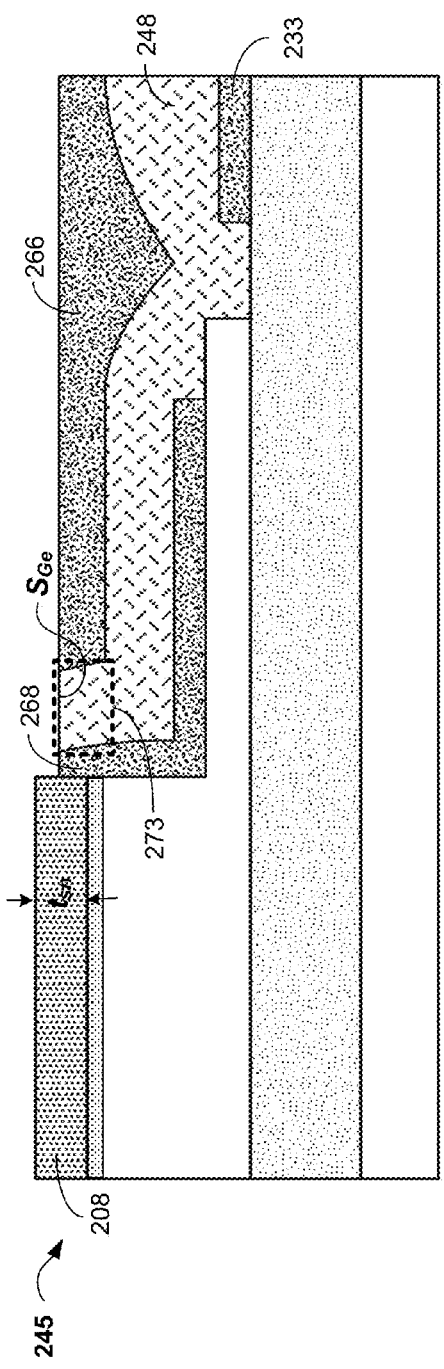
Figure 2E:
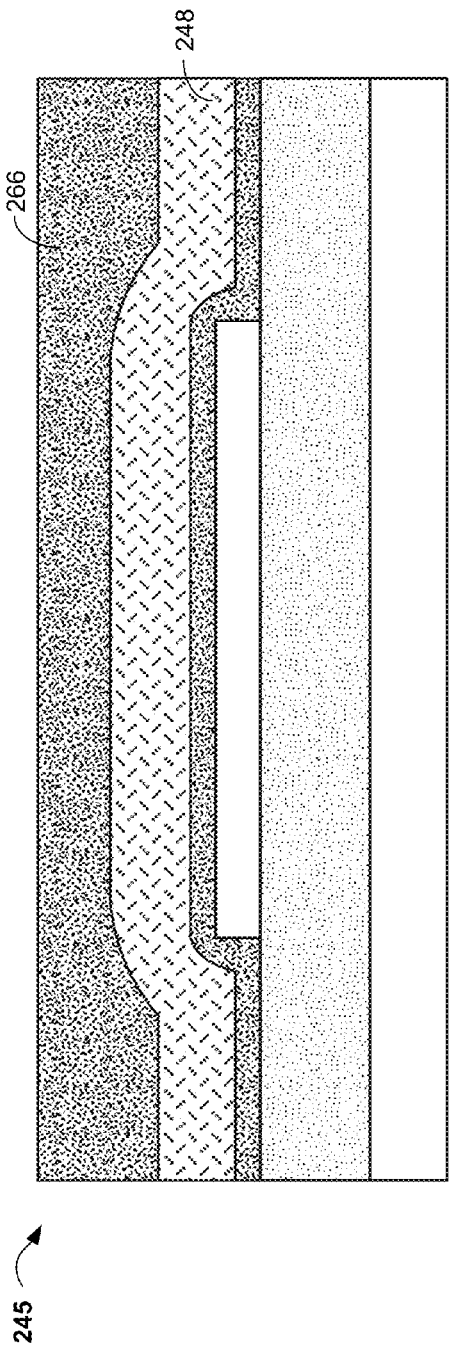

FIG. 2E refers to a cross sectional view of integrated photonic semiconductor structure 245 taken along axis A-A' of FIG. 1. The integrated photonic semiconductor structure 245 may be formed by planarizing integrated photonic semiconductor structure 240 using chemical mechanical polishing (CMP). As depicted, the entire oxide fill 242 (FIG. 2D), the Ge layer 236 (FIG. 2D), and the oxide liner 234 (FIG. 2D) located above silicon nitride layer 208 is removed. During the CMP process, approximately 10-20% of the silicon nitride layer 208 may also be removed in order to ensure that no residual material remains on the surface of the silicon nitride layer 208. Also, region 241 (FIG. 2D), which includes a portion of the oxide fill 242 (FIG. 2D) and a portion of the Ge layer 236 (FIG. 2D), is removed during the CMP process. Thus, following the CMP process, Ge region 248, oxide fill 266, and oxide liner 268 remain. As depicted, the oxide fill 266, oxide liner 268, and Ge layer 248 adjacent the silicon nitride layer 208 may be recessed to about 50% of the thickness $t_{sn}$ of the silicon nitride layer 208.

FIG. 2E' refers to a cross sectional view of the integrated photonic semiconductor structure 245 taken along axis B-B' of FIG. 1. As depicted, following the CMP process, a portion 269 of the oxide fill region 269 (FIG. 2D') is removed.

FIG. 2F refers to a cross sectional view of integrated photonic semiconductor structure 270 taken along axis A-A' of FIG. 1. The integrated photonic semiconductor structure 270 may be formed by creating recess region 272. Recess region 272 may be formed by etching (e.g., RIE etch) portion 273 (FIG. 2E) of Ge region 248 (FIG. 2E) corresponding to integrated photonic semiconductor structure 245 (FIG. 2E). As depicted in FIG. 2E, the exposed surface $S_{Ge}$ of the Ge region 248 may be subjected to chemical attack during subsequent processing steps that may use, for example, various cleaning agents and acids. Thus, the formed recess region 272 depicted in FIG. 2F is utilized to form a plug (see FIG. 2G) that encapsulates the Ge region 248 for protection during the subsequent processing of the integrated photonic semiconductor structure 270.

FIG. 2F' refers to a cross sectional view of the integrated photonic semiconductor structure 270 taken along axis B-B' of FIG. 1. As depicted, FIG. 2F' remains identical with that of FIG. 2E', whereby, following the CMP process, portion 269 (FIG. 2D') of the oxide fill region 242 (FIG. 2D') is removed.

FIG. 2G refers to a cross sectional view of integrated photonic semiconductor structure 275 taken along axis A-A' of FIG. 1. FIG. 2G' refers to a cross sectional view of integrated photonic semiconductor structure 275 taken along axis B-B' of FIG. 1. As depicted in FIG. 2G, the integrated photonic semiconductor structure 275 may be formed by filling recess region 272 (also see FIG. 2F) with silicon nitride fill material 279 (i.e., a silicon nitride plug). FIG. 2G' also shows the deposited silicon nitride fill material 279. As illustrated, Ge region 248 is now encapsulated and, thus, protected by the deposited silicon nitride fill material 279.

FIG. 2H refers to a cross sectional view of integrated photonic semiconductor structure 280 taken along axis A-A' of FIG. 1. The integrated photonic semiconductor structure 280 may be formed by stripping, using hot phosphoric acid ($H_3PO_4$), silicon nitride material layer 208 (FIG. 2G) and the entire silicon nitride fill material 279 (FIG. 2G) located over the oxide fill layer 266. Following the nitride stripping process, silicon nitride plug 282, however, remains over, and facilitates, the encapsulation of Ge region 248 in order to, as previously described, protect the germanium material from subsequent fabrication processes such as cleans. The slow etch rate of oxide layer 203 protects the underlying SOI region 206 during the hot phosphoric acid ($H_3PO_4$) stripping of silicon nitride layer 208 (FIG. 2G).

FIG. 2H' refers to a cross sectional view of integrated photonic semiconductor structure 280 taken along axis B-B' of FIG. 1. As depicted, the nitride stripping process removes silicon nitride fill material 279 (FIG. 2G').

FIG. 2I refers to a cross sectional view of integrated photonic semiconductor structure 290 taken along axis A-A of FIG. 1. As depicted, at the current process stage, FET transistor 291 may be formed adjacent photodetector region 294 within an SOI region of another active region 116c (FIG. 1) separated by STI region 114 (also see FIG. 1). Thus, dopant implants (e.g., phosphorus for N-well regions and boron for P-well regions) may be introduced within a well region 292 (FIG. 2I) of a CMOS device such as an FET 291. A thermal anneal process may be carried out for simultaneously initiating both the activation of the well dopants within the well region 292 and the crystallization of the germanium region 248 (FIG. 2H) that forms photodetector active region 249a. For example, the thermal anneal process may include heating integrated photonic semiconductor structure 290 to a temperature of about 1030° C. for a period of approximately 5 seconds. As previously described, the crystallization of the Ge region 248 (FIG. 2H) and forming active region 249a is accomplished via seed window 102 (FIG. 2H), whereby the germanium material at region 249 (FIG. 2H) contacts the silicon material of SOI layer 206 at surface $S_{SOI}$ (FIG. 2H) for facilitating such crystallization.

As illustrated in FIG. 2I, following the activation of the well dopants within the well region 292 and the crystallization of the germanium region 248 (FIG. 2H) to form active region 249a, region 251 (FIG. 2H) is patterned and etched in order to remove both germanium material from region 251 (FIG. 2H) and oxide fill 266 (FIG. 2H). This germanium material is etched away in order to remove the germanium seed window 102 (FIG. 2H) that was used in the crystallization process. By not removing the germanium seed window 102 (FIG. 2H), subsequent process steps (e.g., thermal anneals for CMOS silicide processes) may cause recrystallization of the germanium region 248 (FIG. 2H), which causes the formation of a polycrystalline germanium material. The formed polycrystalline germanium material may adversely affect the photodetection performance by, for example, reducing the photodetector's responsivity. Thus, recrystallization is eliminated by removing the seed window as described.

Referring to FIG. 2H, within region 251, both the germanium 248 and oxide fill 266 are etched selective to the SOI region 206. Oxide region 233 remains intact. The etch process may be carried-out in two stages, whereby, firstly the oxide fill 266 within region 251 is etched, followed by the germanium 248 within region 251.

Referring to FIG. 2I, following this etching and a subsequent strip-resist process, the etched region, as defined by region 252, may be filled with 1000-2000 Å of, for example, spacer oxide or spacer nitride material, which may be deposited during the formation of spacers for the CMOS FET transistor 291. As depicted, CMOS FET transistor 291 is formed adjacent to the photodetector region 294 via STI isolation region 114. The photodetector region 294 includes Ge active region 249a, whereby the Ge active region 249a is formed adjacent the end facet 243 of optical waveguide 108. In the depicted exemplary embodiment of FIG. 2I, the formed CMOS FET transistor 291 may include a gate dielectric 213, a polysilicon gate electrode 217, spacer oxide regions 219, spacer nitride regions 221, source/drain (S/D) regions 294a, 294b, and halo and extension implants (not shown). Well region 292 and the S/D regions 294a, 294b of FET transistor 291 may be formed within active region 116c (FIG. 1) of silicon-on-insulator (SOI) layer 207 (FIG. 1). A lithographically patterned and etched layer of silicon nitride (not shown) may be formed over the photodetector region 294 having Ge active region 249a. The patterned layer of silicon nitride (not shown) may serve to further protect the photodetector active region 249a during the formation of respective silicide regions 298a, 298b, and 298c on the S/D regions 294a, 294b and the gate electrode 217.

As depicted in FIG. 2I, the photodetector active region 249a is encapsulated by silicon nitride plug 282, oxide liner 234, oxide layer 255, and silicon dioxide/silicon nitride fill material 254. An optical signal, as denoted by $O_{sig}$, is guided along waveguide structure 108, and coupled to the photodetector active region 249a via the oxide liner 234 located between the active region 249a and the end facet 243 of waveguide 108. Although the optical signal $O_{sig}$ received by the active region 249a is attenuated by the oxide liner 234, based on the thickness of this layer 234, the attenuation is low enough in order to not impede the operation and sensitivity of the photodetector. For example, oxide liner 234 may be about 20 Å-40 Å, although greater or lesser thickness values may also be contemplated. The presence of the oxide liner 234 between the end facet 243 of the waveguide 108 and the active region 249a inhibits any direct contact between the germanium material of the active region 249a and the silicon material of the waveguide 108. This mitigates any undesirable recrystallization of the active region 249a that may occur during subsequent processes once the active region 249a is crystallized (i.e., as a single crystalline structure). Thus, the active region 249a of the photodetector abuts the end facet 243 of the waveguide 108 via the thin oxide liner 234 and, therefore, receives substantially the entire optical signal $O_{sig}$ propagating within the waveguide 108 and incident on the end facet 243 of the waveguide 108. Since the abutting of the active region 249a of the photodetector with the waveguide structure 108 facilitates a highly efficient coupling of light between the active region 249a and the waveguide structure 108, the geometric size of the photodetector and, therefore, the active region 249a area may be reduced. By reducing the size of the photodetector's active region 249a area, less device capacitance and higher operational speeds may be achieved.

Although, FET transistor 291 is illustrated as an adjacent device to the photodetector region 294, it may be appreciated that multiple other adjacent transistor devices can be fabricated within other active regions surrounding the photodetector region 294, such as, for example, active regions 116a (FIG. 1) and 116b (FIG. 1). In some implementations, one or more FETs may be electrically connected to one or more photodetectors in order to form optical receiver circuitry.

FIG. 2I' refers to a cross sectional view of integrated photonic semiconductor structure 290 taken along axis B-B' of FIG. 1. As with the embodiment depicted in FIG. 2H', the prior nitride stripping process removed silicon nitride fill material 279 (FIG. 2G').

Figure 2J:
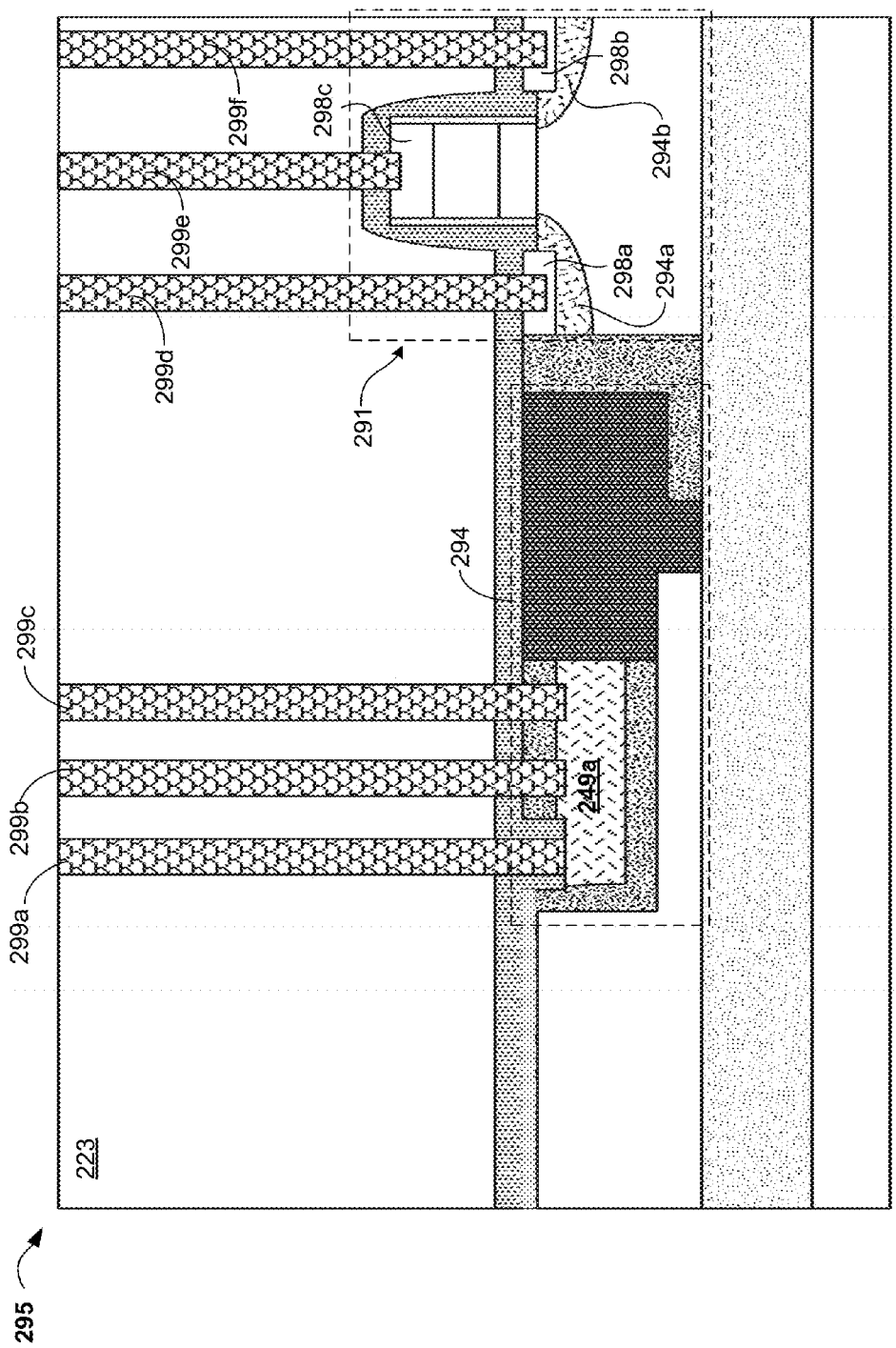
Figure 2J:
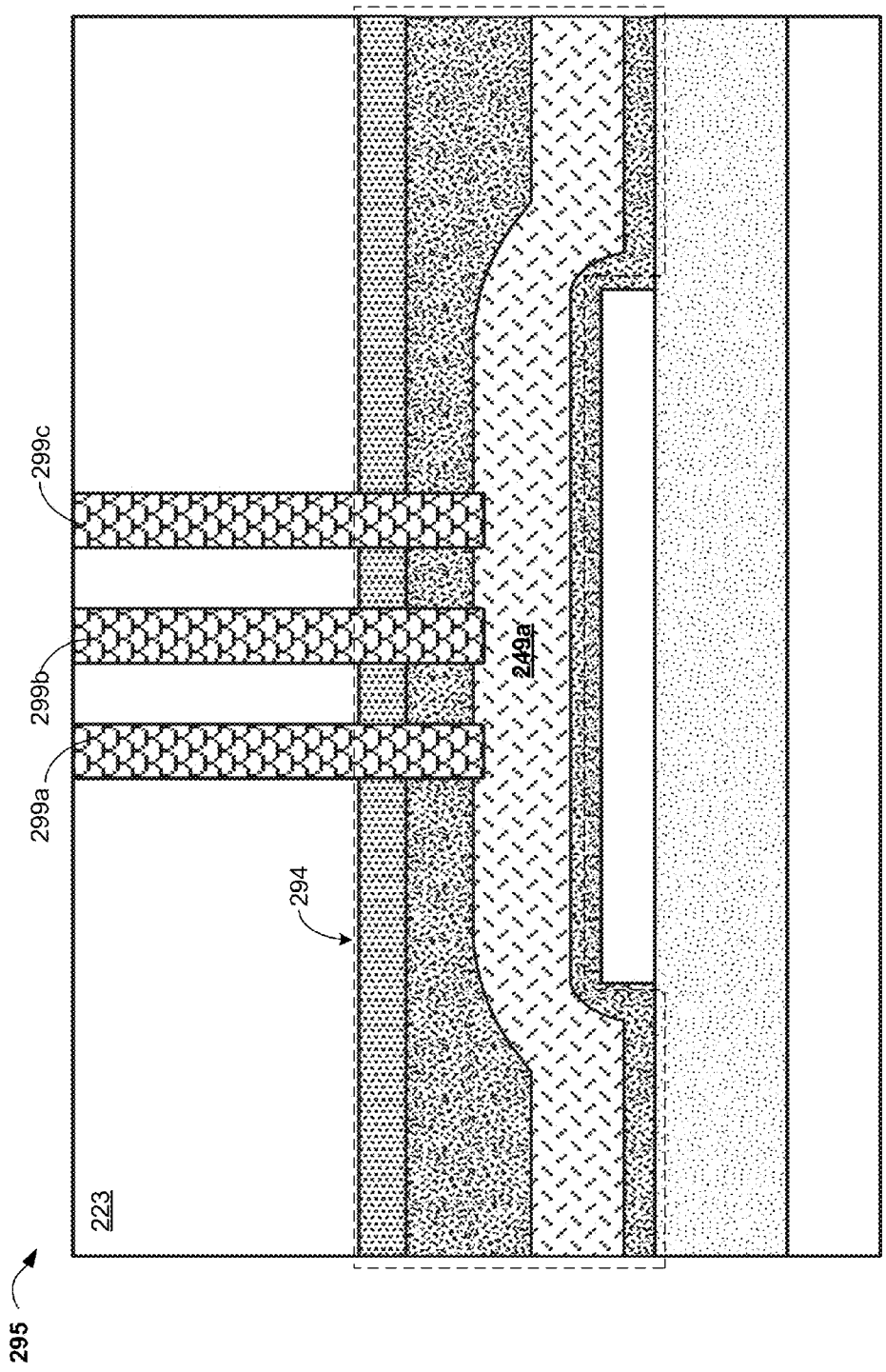

FIG. 2J refers to a cross sectional view of integrated photonic semiconductor structure 295 taken along axis B-B' of FIG. 1. Integrated photonic semiconductor structure 295 may be formed by creating electrical contacts for the photodetector region 294 and CMOS FET transistor 291 of integrated photonic semiconductor structure 290 (FIG. 2I). As depicted, integrated photonic semiconductor structure 295 may be formed by depositing an interlayer dielectric material 223 over integrated photonic semiconductor structure 290 (FIG. 2I). The interlayer dielectric material 223 may, for example, include 5000-10,000 Å of BPSG material. The contacts 299a-299f may be formed by etching into the interlayer dielectric 223. For example, contacts 299a-299c establish electrically conductive connections with Ge active region 249a of photodetector region 294, contact 299d establishes an electrically conductive connection with silicide region 298a of S/D region 294a, contact 299e establishes an electrically conductive connection with gate silicide region 298c, and contact 299f establishes an electrically conductive connection with silicide region 298b of S/D region 294b.

FIG. 2J' refers to a cross sectional view of integrated photonic semiconductor structure 295 taken along axis B-B' of FIG. 1. As depicted, contacts 299a-299c establish electrically conductive connections with Ge active region 249a of photodetector region 294.

FIG. 3 shows a block diagram of an exemplary design flow 900 used for example, in semiconductor IC logic design, simulation, test, layout, and manufacture. Design flow 900 includes processes and mechanisms for processing design structures or devices to generate logically or otherwise functionally equivalent representations of the design structures and/or devices described above and shown in FIG. 2J. The design structure processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems.

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 3 illustrates multiple such design structures including an input design structure 920 that is preferably processed by a design process 910. In one embodiment, the design structure 920 comprises design data used in a design process and comprising information describing the embodiments of the invention with respect to the structure as shown in FIG. 2J. The design data in the form of schematics or HDL, a hardware-description language (e.g., Verilog, VHDL, C, etc.) may be embodied on one or more machine readable media. For example, design structure 920 may be a text file, numerical data or a graphical representation of the embodiment of the invention shown in FIG. 2J. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as that shown in FIG. 2J. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structure shown in FIG. 2J to generate a netlist 980 which may contain a design structure such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 20, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990 comprising second design data embodied on a storage medium in a data format used for the exchange of layout data of integrated circuits and/or symbolic data format (e.g. information stored in a GDSII (GDS2), GL1, OASIS, map files, or any other suitable format for storing such design structures). In one embodiment, the second design data resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of the embodiment of the invention shown in FIG. 2J. In one embodiment, design structure 990 may comprise a compiled, executable HDL simulation model that functionally simulates the device shown in FIG. 2J.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 2J. Design structure 990 may then proceed to a stage 995 where, for example, design structure 990: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiments, the practical application or technical improvement over technologies found in the marketplace, or to enable others of ordinary skill in the art to understand the embodiments disclosed herein.

What is claimed is:

1. A method of forming an integrated photonic semiconductor structure having a photodetector device and a CMOS device comprising:
    forming a well region for the CMOS device;
    forming an isolation region extending from a top surface of the photodetector device to an underlying oxide layer for electrically isolating the photodetector device from the well region, wherein the isolation region is in direct physical contact with the underlying oxide layer;
    forming a semiconductor optical waveguide for propagating optical signals; and
    depositing, within the isolation region, germanium material adjacent to an end facet of the semiconductor optical waveguide,
    wherein the deposited germanium material forms an active region of the photodetector device for receiving the propagating optical signals from the end facet of the semiconductor optical waveguide structure.

2. The method of claim 1, further comprising:
    performing a thermal anneal process for simultaneously initiating activating well dopants
    within the well region and crystallizing the deposited germanium material that forms the active region.

3. The method of claim 2, wherein the thermal anneal process comprises heating the integrated photonic semiconductor structure to a temperature of about 1030° C. for a period of about 5 seconds.

4. The method of claim of claim 1, further comprising:
    depositing an insulating oxide fill material over opposing side walls of the semiconductor optical waveguide, wherein the semiconductor optical waveguide comprises a core region and the insulating oxide fill material deposited over the opposing side walls comprises a cladding.

5. The method of claim 4, wherein the insulating oxide fill material comprises a silicon dioxide ($SiO_2$) material.

6. The method of claim 1, wherein the deposited germanium material comprises a thickness of about 50-200 nm.

7. The method of claim 1, wherein the depositing of the germanium material adjacent the end facet comprises utilizing one of a physical vapor deposition (PVD) process, a plasma enhanced chemical vapor deposition (PECVD) process, a rapid thermal chemical vapor deposition (RTCVD) process, and a reduced pressure chemical vapor deposition (RPCVD) process.

8. The method of claim 1, wherein the isolation region comprises a shallow trench isolation (STI) region.

9. The method of claim 1, wherein the semiconductor optical waveguide is formed from a silicon-on-insulator (SOI) layer located over a buried oxide (BOX) layer.

10. The method of claim 1, wherein the CMOS device comprises an PET.

11. The method of claim 1, wherein the semiconductor optical waveguide propagates optical signals having a wavelength of about 1550 nm.

12. The method of claim 1, wherein the semiconductor optical waveguide propagates optical signals having a wavelength of about 1310 nm.

13. A method of forming an integrated photonic semiconductor structure having a photodetector device and a CMOS device comprising:
    forming a well region for the CMOS device;
    forming an isolation region for electrically isolating the photodetector device from the well region;
    forming a semiconductor optical waveguide for propagating optical signals;
    depositing, within the isolation region, germanium material adjacent to an end facet of the semiconductor optical waveguide, wherein the deposited germanium material forms an active region of the photodetector device for receiving the propagating optical signals from the end facet of the semiconductor optical waveguide structure; and
    depositing an oxide liner within the isolation region prior to the depositing of the germanium material, wherein the oxide liner separates the end facet of the semiconductor optical waveguide from the adjacent deposited germanium material.

14. The method of claim 13, wherein the oxide liner comprises a thickness of about 20-40 nm.

15. A method of forming an integrated photonic semiconductor structure having a photodetector device and a CMOS device comprising:
    forming a silicon optical waveguide on a second silicon-on-insulator region;
    forming a shallow trench isolation region surrounding the silicon optical waveguide, the shallow trench isolation region electrically isolating the first and the second silicon-on-insulator region; and
    depositing, within a region of the shallow trench isolation region, germanium material adjacent an end facet of the semiconductor optical waveguide;
    wherein the deposited germanium material forms an active region of the photodetector device for receiving propagating optical signals from the end facet of the semiconductor optical waveguide.

16. The method of claim 15, wherein the deposited germanium material is separated from the end facet of the semiconductor optical waveguide by an oxide liner.

17. The method of claim 16, wherein the oxide liner comprises an oxide layer having a thickness of about 20-40 nm.

18. The method of claim 15, wherein the shallow trench isolation region comprises a silicon dioxide ($SiO_2$) fill material.

19. The method of claim 15, wherein the deposited germanium material comprises a thickness of about 50-200 nm.

* * * * *